(12) United States Patent
Okabayashi et al.

(10) Patent No.: US 8,907,621 B2
(45) Date of Patent: Dec. 9, 2014

(54) CHARGING APPARATUS

(75) Inventors: Kazuo Okabayashi, Fukuoka (JP);
Yasuji Fukuda, Fukuoka (JP); Kengo Nagamitsu, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 429 days.

(21) Appl. No.: 13/349,566

(22) Filed: Jan. 13, 2012

(65) Prior Publication Data

US 2012/0181984 A1 Jul. 19, 2012

(30) Foreign Application Priority Data

Jan. 17, 2011 (JP) ................................. 2011-007016

(51) Int. Cl.
*H02J 7/00* (2006.01)
*B60L 11/18* (2006.01)

(52) U.S. Cl.
CPC ......... *B60L 11/1825* (2013.01); *B60L 11/1824* (2013.01); *B60L 11/1818* (2013.01); *Y02T 10/7005* (2013.01); *Y02T 10/7088* (2013.01); *Y02T 90/128* (2013.01); *Y02T 90/14* (2013.01)
USPC ........................................................ 320/109

(58) Field of Classification Search
CPC . B60L 11/1824; B60L 11/1818; Y02T 90/12; Y02T 10/7077; Y02T 10/7088; G06Q 30/02
USPC ........................................................ 320/109
See application file for complete search history.

(56) References Cited

U.S. PATENT DOCUMENTS

| | | | | |
|---|---|---|---|---|
| 5,548,200 | A | * | 8/1996 | Nor et al. ...................... 320/109 |
| 5,614,808 | A | * | 3/1997 | Konoya et al. ................ 320/109 |
| 5,921,803 | A | * | 7/1999 | Mori ............................. 439/387 |
| 8,344,692 | B2 | | 1/2013 | Sakurai |
| 2007/0290039 | A1 | * | 12/2007 | Pfleging et al. ............... 235/384 |
| 2010/0315040 | A1 | | 12/2010 | Sakurai |
| 2011/0106329 | A1 | * | 5/2011 | Donnelly et al. ............. 700/291 |

FOREIGN PATENT DOCUMENTS

| | | |
|---|---|---|
| JP | 03-025060 | 2/1991 |
| JP | 07-143610 | 6/1995 |
| JP | 2009-065785 | 3/2009 |
| JP | 3163783 U | 6/2010 |
| JP | 2010-161899 | 7/2010 |
| JP | 2010-288386 | 12/2010 |

OTHER PUBLICATIONS

Japanese Office Action for corresponding JP Application No. 2011-007016, Apr. 23, 2013.
Chinese Office Action for corresponding CN Application No. 201210015089.X. May 4, 2014.

* cited by examiner

*Primary Examiner* — M'Baye Diao
(74) *Attorney, Agent, or Firm* — Mori & Ward, LLP

(57) ABSTRACT

A charging apparatus for charging electric power supplied from a power source to a charging target includes a station section configured to supply the electric power to the charging target. The station section includes a base extending in a vertical direction and a protrusion fixed to a part of the base and protruding frontward than the base. Space for disposing at least one article is formed on at least one of the upper side and the lower side of the protrusion.

10 Claims, 16 Drawing Sheets

CHARGING APPARATUS

TECHNICAL FIELD

The present invention relates to charging apparatuses.

BACKGROUND ART

Japanese Utility Model Registration No. 3163783 discloses a charging station for electric vehicles, etc. installed in a parking lot. The charging station is provided with a plurality of charging poles. The charging poles include a conducting slot to which electric power is supplied from an outside power source. Further, a bulletin body is provided over the charging poles. An advertising information section is formed on the obverse surface of the bulletin body so as to be capable of being displayed.

SUMMARY OF THE INVENTION

A charging apparatus according to one embodiment is a charging apparatus for charging electric power supplied from a power source to a charging target, including: a station section configured to supply the electric power to the charging target, wherein the station section includes: a base extending in a vertical direction; and a protrusion fixed to a part of the base and protruding frontward than the base, and space for disposing at least one article is formed on at least one of the upper side and the lower side of the protrusion.

DETAILED DESCRIPTION OF EMBODIMENTS

Embodiments which the present application discloses will be discussed next with reference to the accompanying drawings. It is noted that parts irrelevant to the description may not be shown in the respective drawings in some cases.

Figure 1:
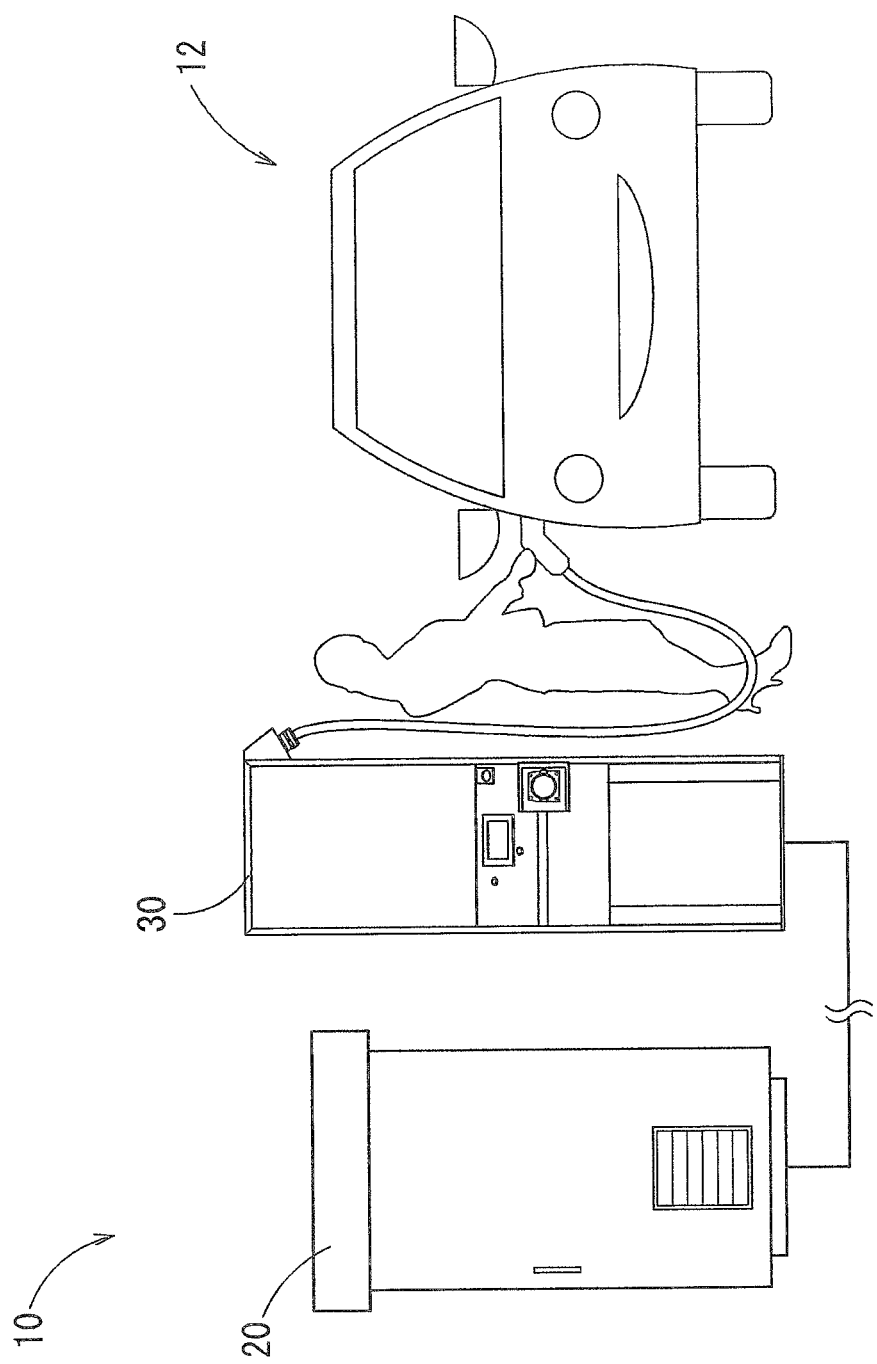
FIG. 1 is an explanatory illustration showing a use state of a charging apparatus according to one embodiment of the present invention.
Figure 2:
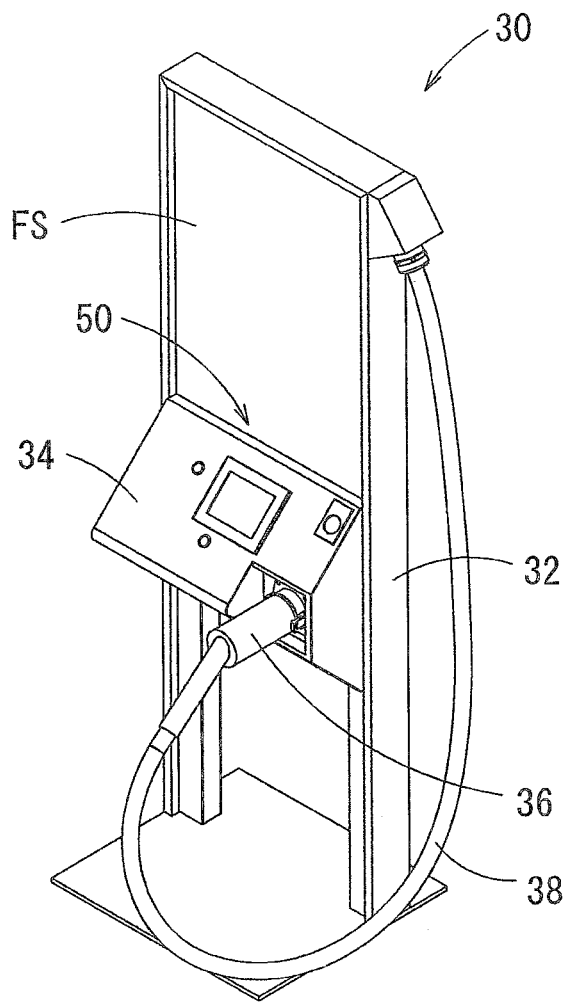
FIG. 2 is a perspective view of a station section included in the charging apparatus.

As shown in FIG. 1, a charging apparatus 10 according to one embodiment of the present invention is capable of charging a battery boarded on an electric vehicle (one example of a charging target) 12, for example. The charging apparatus 10 can be installed not only at an existing filling station but also at a store, such as a convenience store, etc. and a parking lot. The installation site of the charging apparatus 10 may be indoor or outdoor.

The charging apparatus 10 includes a power source section 20 and a station section 30.

The power source section 20 is installed in a site apart from the station section 30. The power source section 20 is capable of converting commercial power source to electric power and supplying electric power necessary for charging a charging target to the station section 30.

The station section 30 can supply the electric power supplied from the power source section 20 directly to the electric vehicle 12 or the like.

As shown in FIGS. 2-8, the station section 30 includes a base 32, a protrusion 34, and a charging cable 38. The charging cable 38 extends downward from the upper part of the base 32. Further, a charging connector 36 to be connected to the charging target is attached to the distal end of the charging cable 38.

The base 32 extends along a vertical direction (upward from the installation plane). Two pillars 40, for example, are provided at the lower part of the base 32 (see FIGS. 3 and 6).

Figure 5:
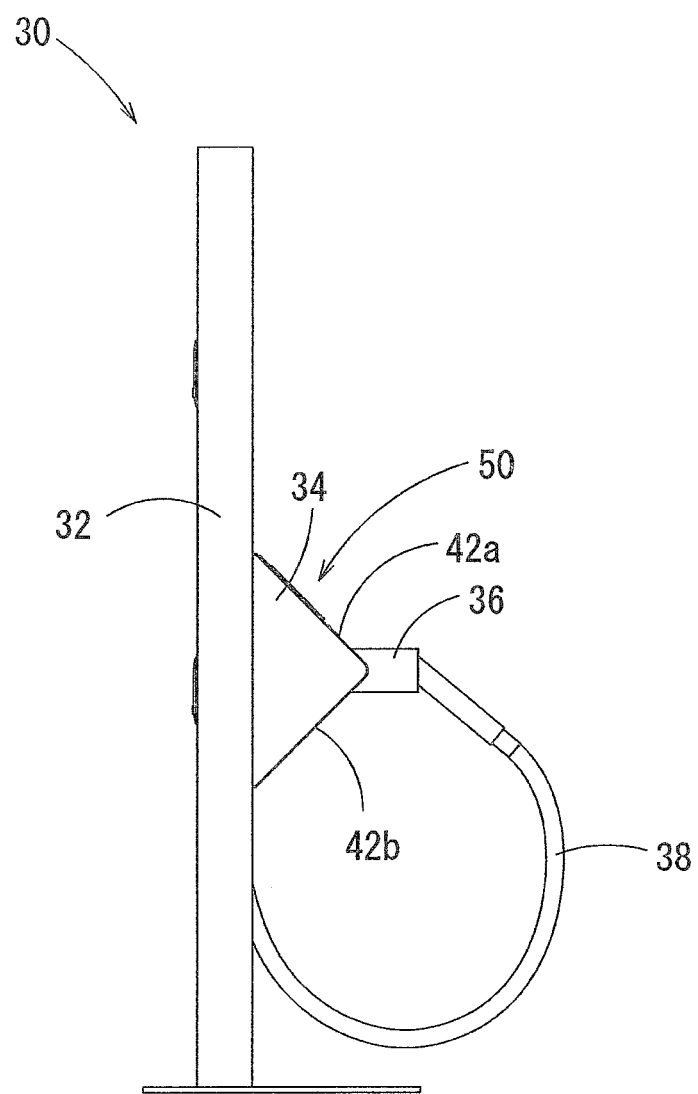
FIG. 5 is a left side view of the station section included in the charging apparatus.

The protrusion 34 is fixed to the base 32 at a predetermined height. The protrusion 34 is fixed to a part of the base 32. The protrusion 34 is composed of at least an upper plate 42a extending obliquely frontward and downward from the base 32 and a lower plate 42b extending obliquely frontward and upward from the base 32. The protrusion 34 protrudes frontward than the base 32. That is, as shown in FIG. 5, the protrusion 34 is in triangular shape when viewed from the left side of the charging apparatus 10, and its vertical width (distance between the upper plate 42a and the lower plate 42b) decreases as it goes frontward from the base 32. The tip end part where the upper plate 42a is in contact with the lower plate 42b is rounded.

Figure 3:
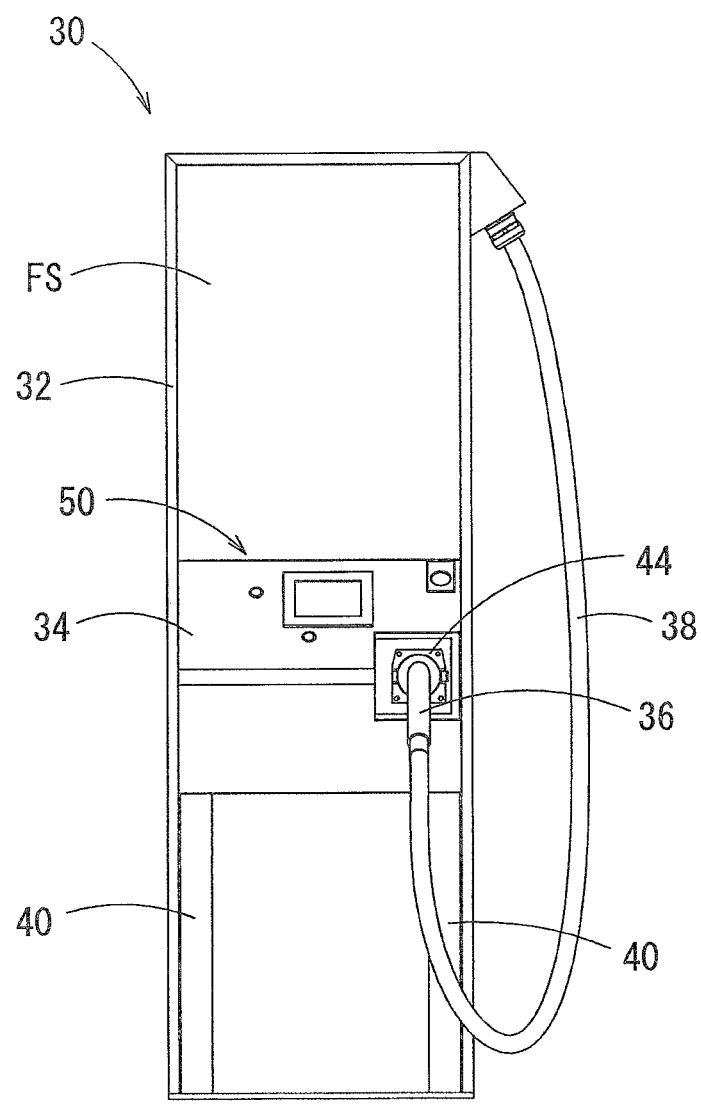
FIG. 3 is a front view of the station section included in the charging apparatus.
Figure 4:
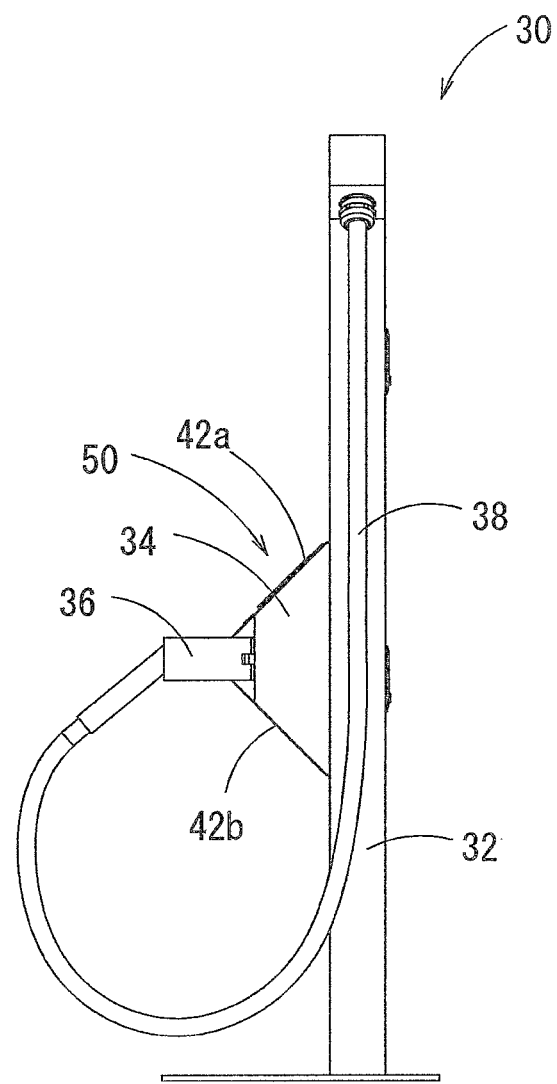
FIG. 4 is a right side view of the station section included in the charging apparatus.

Further, the protrusion 34 is notched in the right end part thereof to form a notched portion. As shown in FIG. 3, a catcher 44 for catching the charging connector 36 is provided in the notched portion.

Moreover, the protrusion 34 includes an operating tool 50 for operating to charge to the charging target. For example, the operating tool 50 is provided on the upper plate 42a of the protrusion 34. Operation buttons (a start button 52a and a stop button 52b) for operation (charging operation) of the charging apparatus 10 are arranged on the operating tool 50 (see FIGS. 3-5 and 14). Each operation button arranged on the operating tool 50 is arranged within a height range of 1000±200 mm from the ground plane of an operator using the charging apparatus 10. It is noted that this height range may be preferably set to 1000±150 mm, and more preferably 1000±100 mm. With the operation buttons of the operating tool 50 arranged within this range, the charging apparatus 10 according to one embodiment can provide favorable operability to an operator even in a wheelchair operating the charging apparatus 10.

Further, since the charging connector 36 is caught in the right end part of the protrusion 34 set at the operation-easy height, it is easy for the operator to operate the charging apparatus 10.

Figure 6:
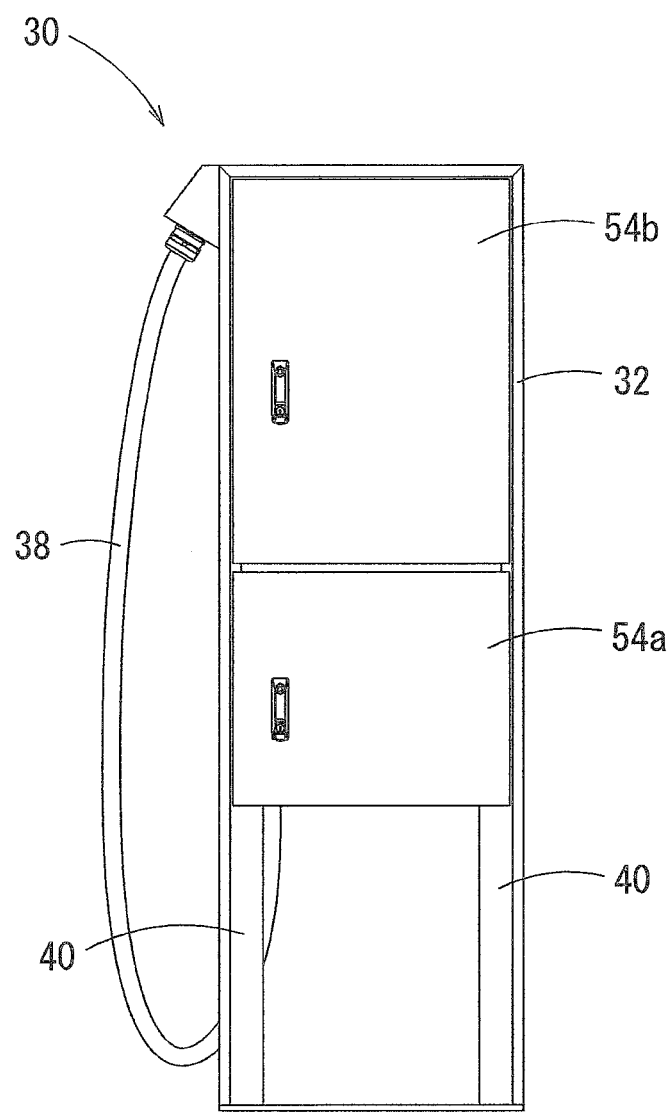
FIG. 6 is a rear view of the station section included in the charging apparatus.
Figure 7:
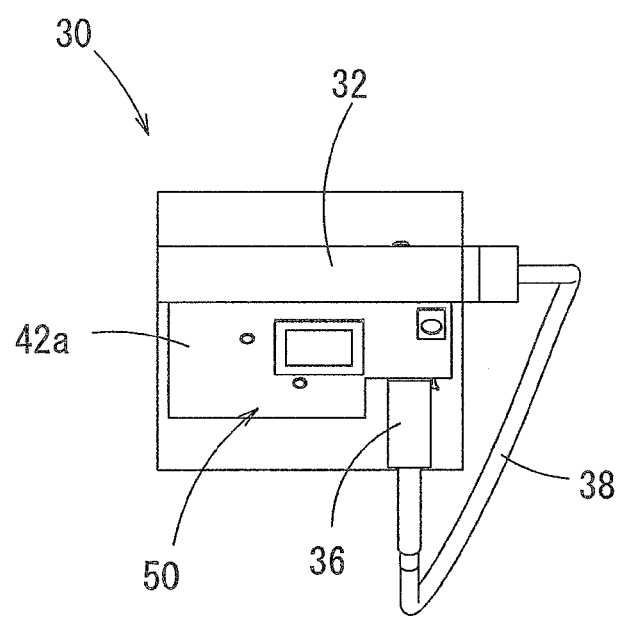
FIG. 7 is a plan view of the station section included in the charging apparatus.
Figure 8:
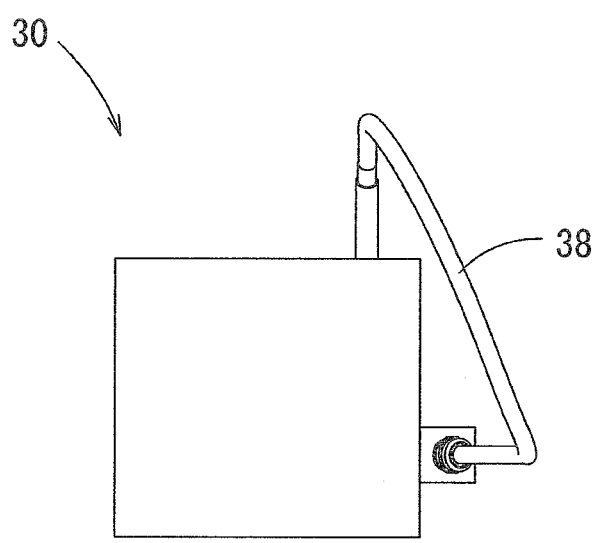
FIG. 8 is a bottom view of the station section included in the charging apparatus.

The protrusion 34 is provided on the front surface (the surface facing the operator when the operator operates the charging apparatus 10) of the station section 30, while a first rear door 54a is provided at a portion of the back surface (the surface opposite to the front surface of the station section 30) of the station section 30 which corresponds to the protrusion 34, as shown in FIG. 6. When the first rear door 54a is opened, a controller (not shown) for controlling the operating tool 50 arranged inside the protrusion 34 can be maintained.

As described with reference to FIGS. 2-5, provision of the protrusion 34 protruding frontward than the base 32 in the operating tool 50 can enhance the operability of the charging apparatus 10.

The charging cable 38 is arranged to extend downward from the upper right part of the base 32. The length of the charging cable 38 is set so as not to come into contact with the ground when the charging connector 36 at the distal end of the charging cable 38 is caught in the catcher 44.

Here, space for disposing an article (hereinafter referred to as "free space") FS is formed on the upper side of the part where the protrusion 34 is fixed.

Any article appealing to a user of the charging apparatus 10 can be disposed in the free space FS.

Figure 9:
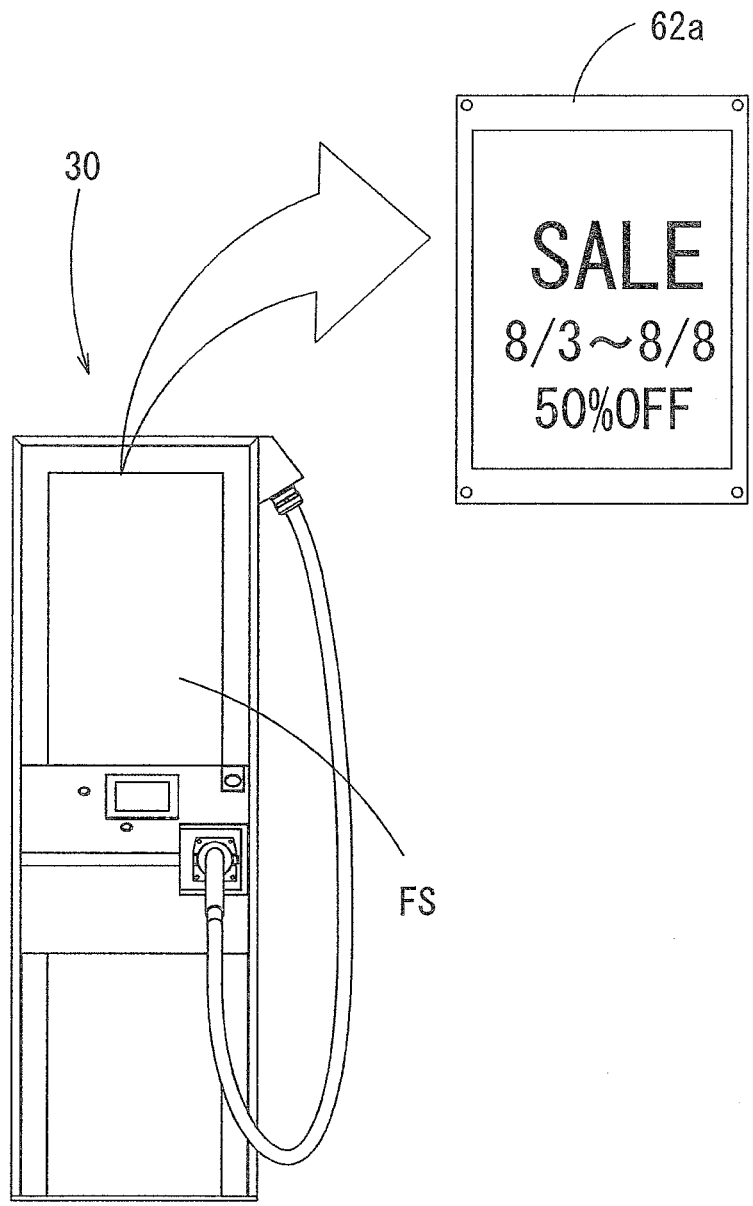
FIG. 9 is an explanatory illustration showing a first utilization manner of free space of the station section included in the charging apparatus.

Referring to a first example, the article is a bulletin board 62a (see FIG. 9). The front surface of the bulletin board 62a is covered with a glass plate. Posting up an advertisement of a store on the bulletin board 62a enables an installation personnel (e.g., an owner of a filling station, a store, or a parking lot) to promote sales to the users.

Figure 10:
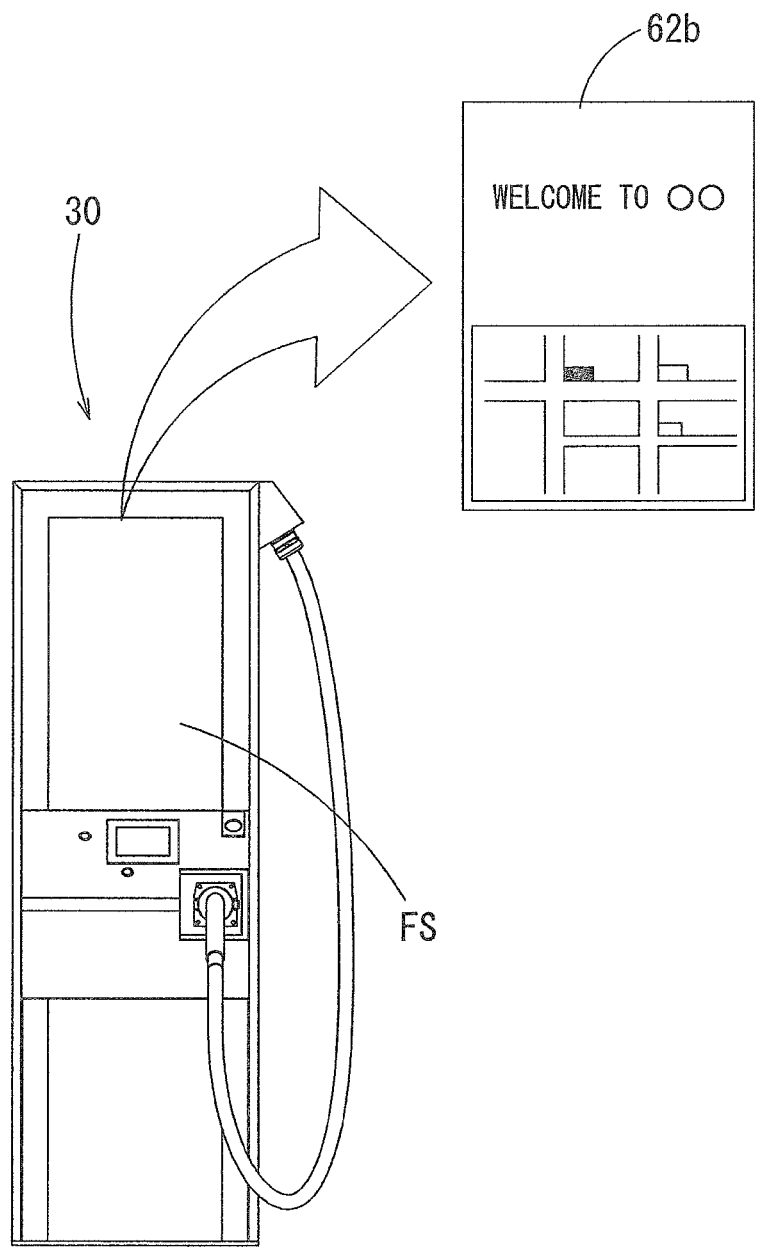
FIG. 10 is an explanatory illustration showing a second utilization manner of the free space of the station section included in the charging apparatus.

Referring to a second example, the article is a monitor 62b that displays information (see FIG. 10). Displaying an advertisement, a shop information map, a sightseeing map in the neighborhood, etc. on the monitor 62b enables the installation personnel to offer user's convenience.

Figure 11:
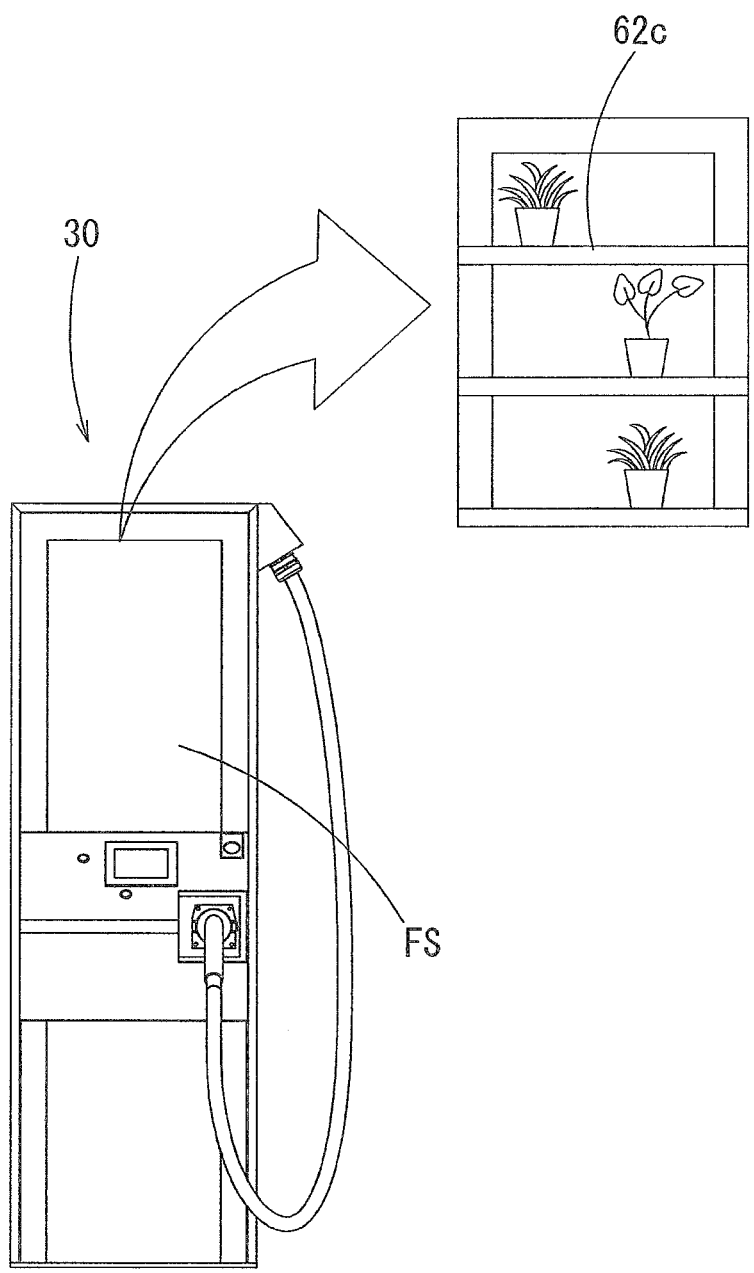
FIG. 11 is an explanatory illustration showing a third utilization manner of the free space of the station section included in the charging apparatus.

Referring to a third example, the article is a shelf 62c (see FIG. 11). Arranging the shelf 62c in the free space FS and decorating the shelf 62c with foliage plants enable the installation personnel to enhance the shop image.

Figure 12:
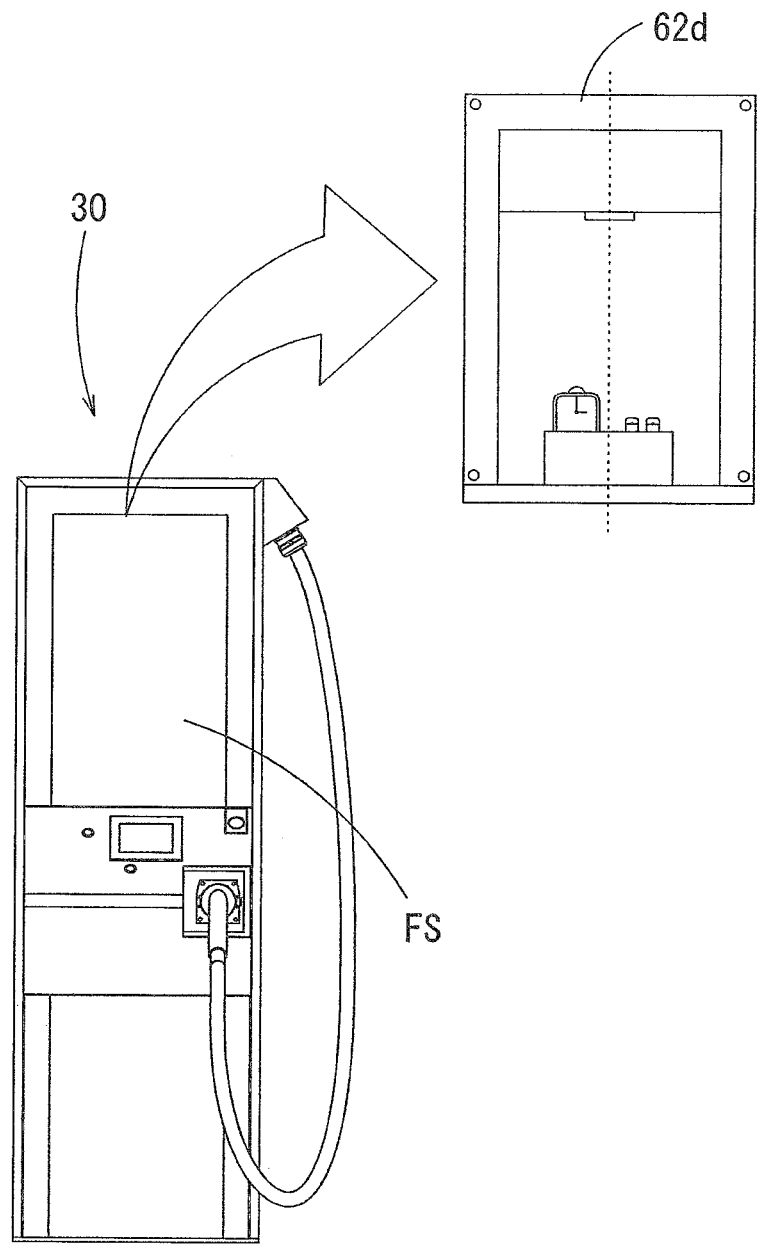
FIG. 12 is an explanatory illustration showing a fourth utilization manner of the free space of the station section included in the charging apparatus.

Referring to a fourth example, the article is a showcase 62d that displays goods (see FIG. 12). The owner of a store or the like as the installation personnel of the charging apparatus 10 can publicize the goods and services to the users.

Figure 13:
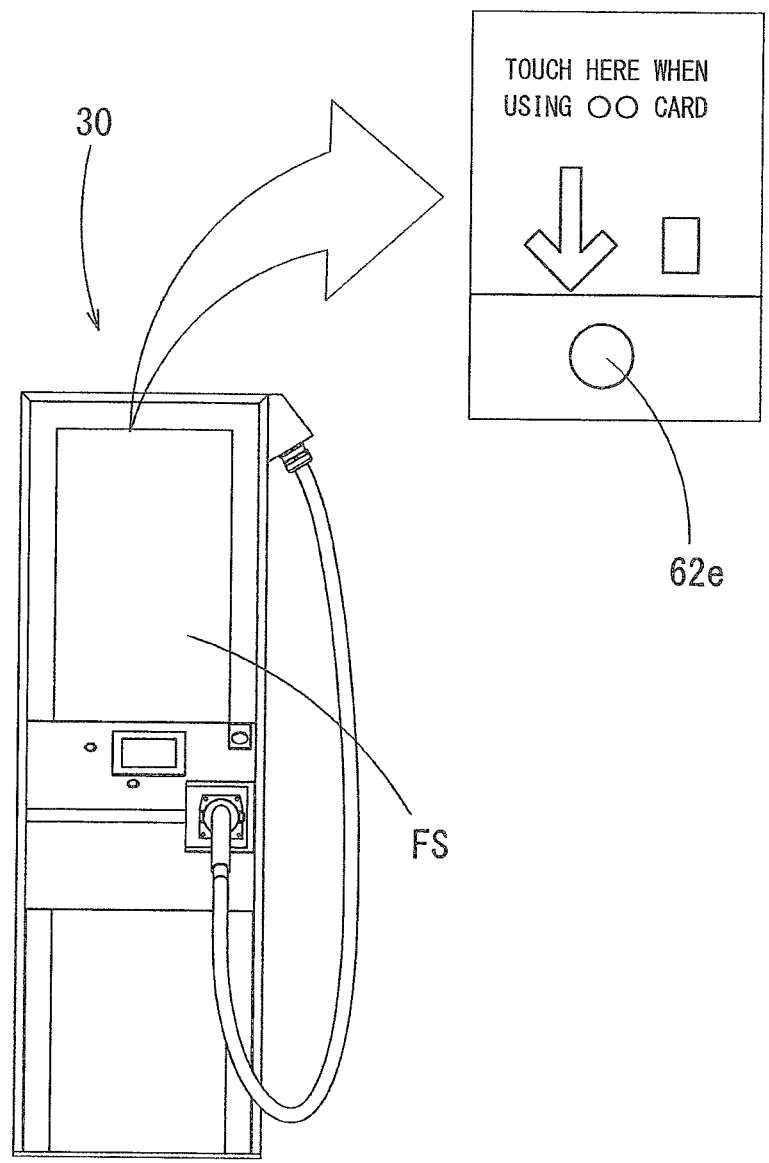
FIG. 13 is an explanatory illustration showing a fifth utilization manner of the free space of the station section included in the charging apparatus.

Referring to a fifth example, the article is a reader 62e (see FIG. 13). The reader 62e reads the information of a noncontact IC card (one example of cards). Providing the reader 62e in the free space FS enables the installation personnel to enhance the user's convenience.

Referring further to a sixth example, the article can be a mirror.

It is noted that in one embodiment, the position where the free space FS is formed is not limited to the upper side of the part where the protrusion 34 is fixed. As far as the free space FS serves as space used for disposing the article, the position where the free space FS is formed can be located on the lower side of the part where the protrusion 34 is fixed. Further, the position where the free space FS is formed may be located on both the upper side and the lower side of the part where the protrusion 34 is fixed.

For example, the mirror can be disposed on the upper side of the part where the protrusion 34 is fixed, while the shelf 62c can be disposed on the lower side of the part where the protrusion 34 is fixed. Further, two or more articles (e.g., the mirror and the shelf) can be disposed on at least one of the upper side and the lower side of the part where the protrusion 34 is fixed.

As described above, since the free space FS used for disposing the article is formed in the station section 30, the charging apparatus 10 according to the present invention enables the installation personnel to hold an added value besides provision of the charging function to the user.

It is noted that, as shown in FIG. 6, the free space FS is provided on the front surface (the surface facing the operator when the operator operates the charging apparatus 10) of the station section 30, while a second rear door 54b is provided at a part of the back surface (the surface opposite to the front surface of the station section 30) of the station section 30 which corresponds to the free space FS.

The charging apparatus 10 according to the present embodiment has been described with reference to FIGS. 1-13. It is noted that the present embodiment is not limited to the charging apparatus 10 including the power source section 20. As far as the charging apparatus 10 includes the station section 30, the power source section 20 may be an outside power source for the charging apparatus 10.

In the charging apparatus 10 according the present embodiment, the station section 30 functions as "a power supply means configured to supply electric power to a charging target". The base 32 functions as "a fixing means extending in a vertical direction". The protrusion 34 functions as "a protruding means protruding frontward than the fixing means". The fixing means fixes the protruding means. Space for disposing at least one article is formed at least above or below the protruding means in the charging apparatus 10.

The operating tool 50 provided on the upper plate 42a of the protrusion 34 will be described next in detail with reference to FIGS. 1, 4, and 14-16.

Figure 14:
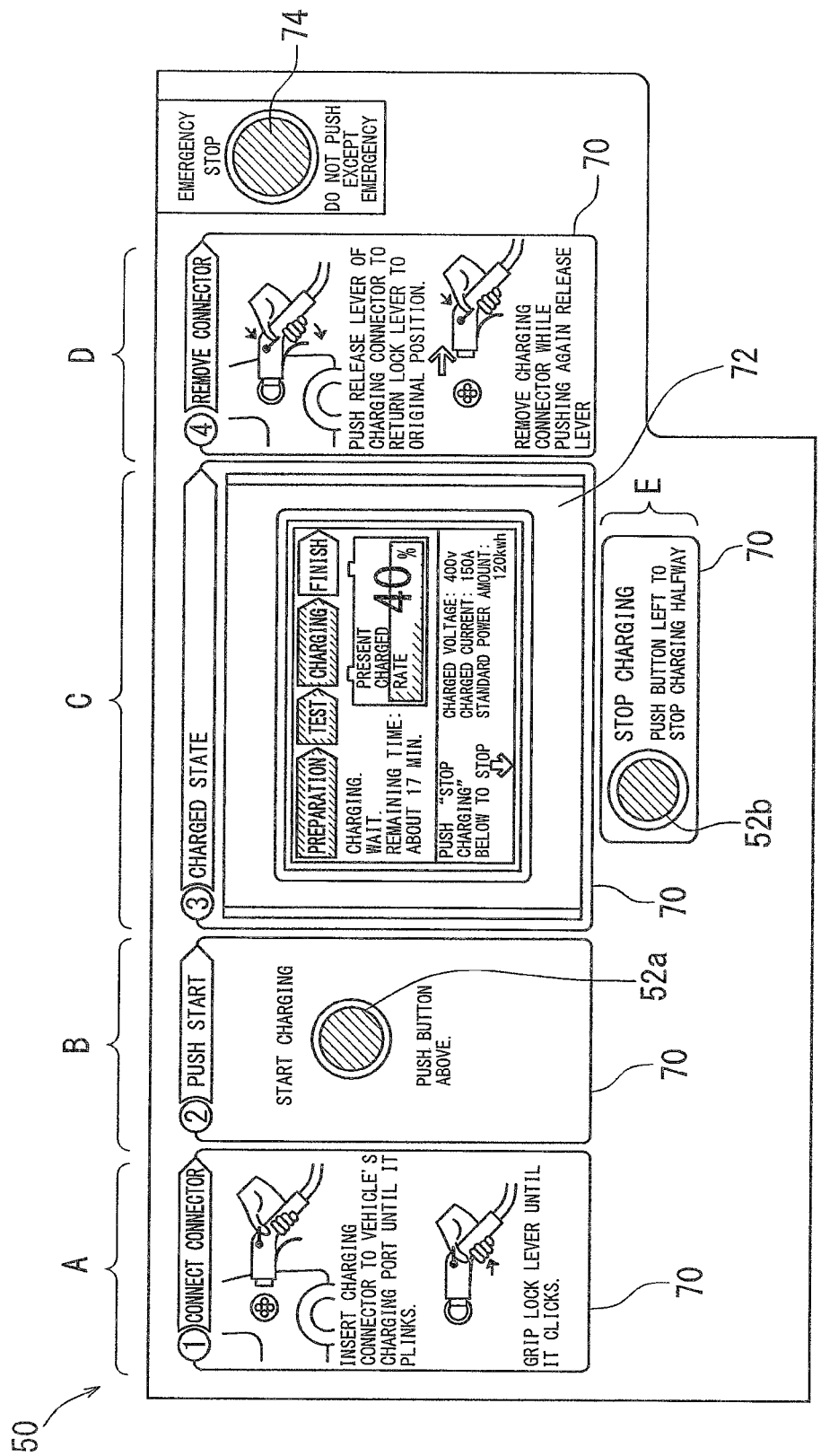
FIG. 14 is a front view of an operating tool provided in the charging apparatus.

The operating tool 50 is for operating to charge to the charging target. A plurality of first regions that display the operation of the apparatus step by step are provided along a first direction in the operating tool 50. One of the first regions indicates steps of operating operation buttons. The operation buttons are arranged in another region. Specifically, as shown in FIG. 14, regions A-D (the plurality of first regions) indicating respective operation steps of the charging apparatus 10 are arranged in line along the direction (the first direction) from left to right in the operating tool 50. Each region A-D is surrounded by a frame 70. Numbers corresponding to the respective operation steps are noted at the upper end parts of the respective regions A-D. Further, the summary of each operation step is noted on the right side of the corresponding number.

In the region A, steps of connecting a connector, which is to be connected to a charging target, to the charging target are indicated. Referring to a specific example, steps of connecting the charging connector 36 to a charging target, for example, the electric vehicle 12 or the like (information on inserting the charging connector 36 to the electric vehicle 12 and information on handling a lever of the charging connector 36) are indicated in group together with illustrations in the region A.

In the region B, a start switch (operation button) to start charging to a charging target is arranged, and a step of operating the start switch (step of operating the operation button) is indicated. Referring to a specific example, in the region B, the start button 52a (hardware switch) to start charging to the charging target is arranged, and a step of operating the start button 52a is indicated.

The charged state of a charging target is indicated in the region C. As a specific example, an indicator 72 is arranged in the region C. The indicator 72 indicates the charged state of the charged target.

Steps of removing the charging connector 36 from the charging target (information on handling the lever of the charging connector 36 and information on removing the charging connector 36 from the charging target) are indicated in group together with illustrations in the region D. It is noted that an emergency stop button 74 for emergency stop of the charging operation is arranged on the upper right side of the region D.

Figure 15:
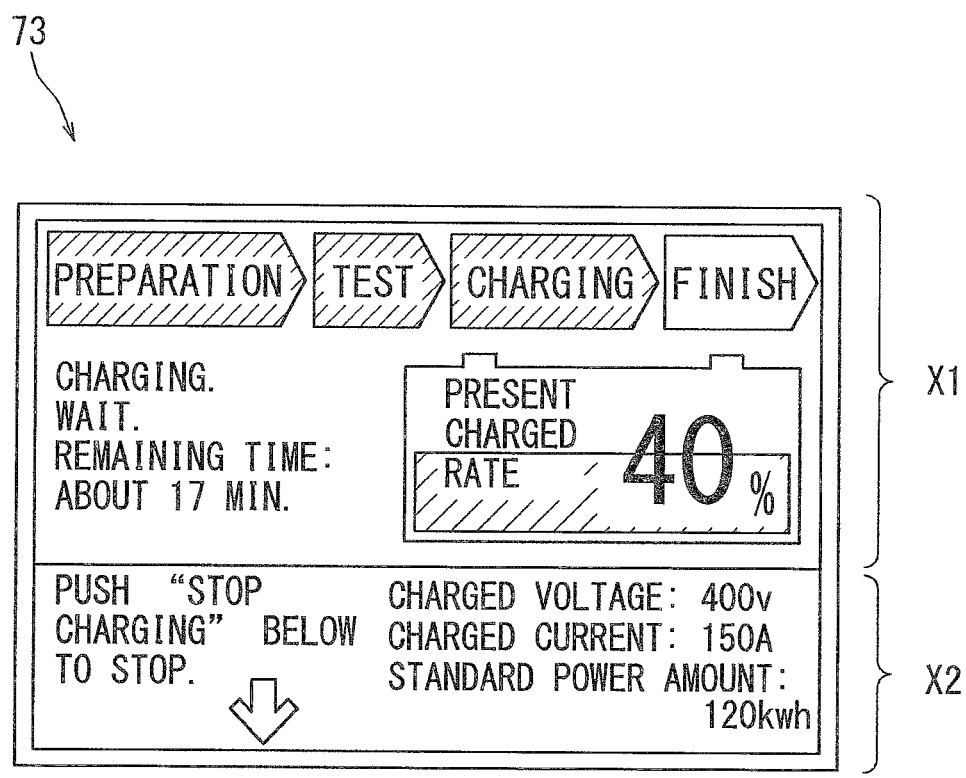
FIG. 15 is an explanatory illustration of a display screen of the operating tool provided in the charging apparatus.
Figure 16:
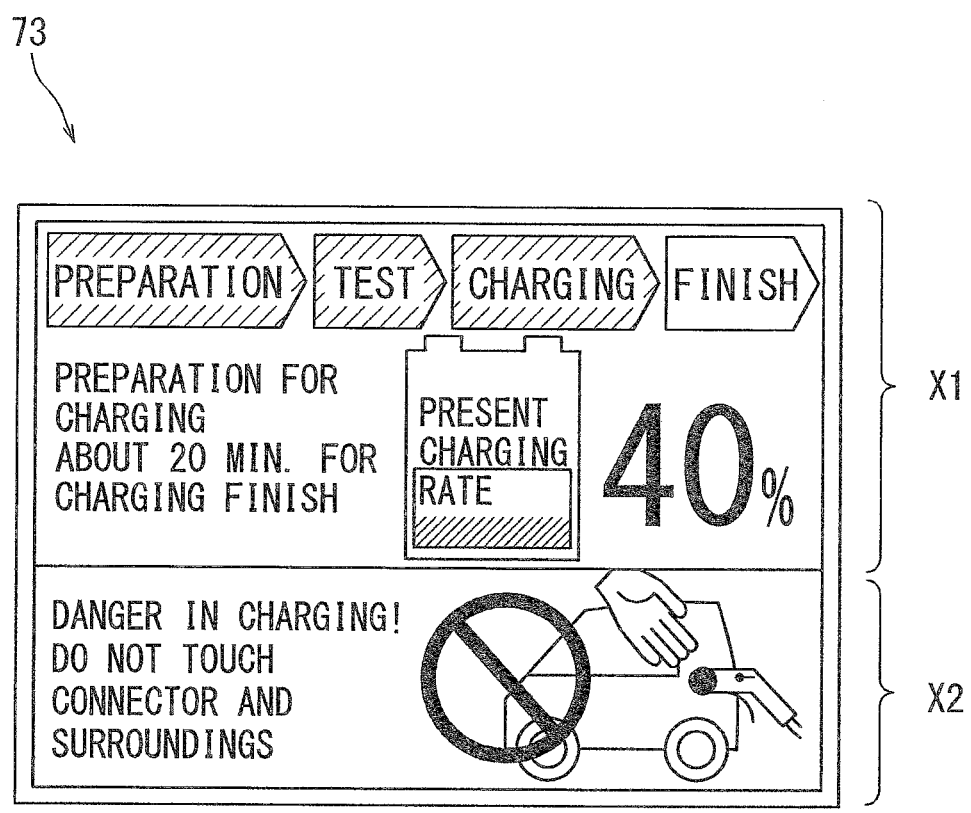
FIG. 16 is an explanatory illustration of a display screen of the operating tool provided in the charging apparatus.

As described in detail with reference to FIGS. 14-16, the operation steps are displayed in the regions A-D, and the regions A-D are arranged in line along the first direction (e.g., direction from left to right). Thus, the operator can easily understand the flow of the operation steps.

Here, if the buttons and the indication of the steps of operating the buttons (explanation of the operation) are separately arranged, the operator must understand the correspondence between the buttons and the explanation of the operation. However, in the operating tool 50 described in the present embodiment, the buttons and the indication of the steps of operating the buttons are arranged correspondingly, as in the region B. Thus, the operator is not required to understand the correspondence, thereby enabling intuitively operation.

In the operating tool 50, a second region displaying a step of stopping the operation is further arranged along a direction different from the first direction. A stop button to stop the operation is arranged in the second region. For example, a region E (second region) is arranged below the region C. In the region E, a step of stopping the charging operation is indicated, and a stop switch to stop the charging operation is further arranged. Referring to a specific example, in the region E, the stop button 52b (hardware switch) to stop the charging operation is arranged, and the step of operating the stop button 52b is indicated.

The start button 52a is a button to be usually operated in accordance with the operation steps. By contrast, the stop operation is unusual operation, and the stop button 52b is used only when necessary for the operator. Accordingly, the stop button 52b is arranged so as not to be located adjacent to the start button 52a.

As described in detail with reference to FIG. 14, the region C and the region E are arranged along the second direction different from the first direction. The region E, which includes the stop button 52b that is not usually used, is arranged along the direction (second direction) different from the direction in which the regions A-D, which indicate the usual operation steps, are arranged. Thus, an operator unaccustomed to the operation can understand the region E as a region indicating the unusual operation, thereby reducing misoperation.

It is noted that depending on an apparatus as an operation target, the regions A-D may be arranged in line along the direction going down from above, while the region E is arranged on the right side of the region C. That is, the first direction may be set to go down from above, while the second direction is set to go right from left.

Displayed information of the indicator 72 arranged in the region C will be described next.

The indicator 72 is a monochrome liquid crystal panel, for example. As shown in FIGS. 15 and 16, a display screen 73 of the indicator 72 includes at least a first display region X1 and a second display region X2 arranged below the first display region X1.

The first display region X1 displays information on the charged state of the charging target. The information on the charged state is status indicting, as shown in FIG. 15 for example: 1) character information, such as "Charging. Wait. Remaining Time: About 17 Minutes"; 2) an illustration indicating a charging rate of the buttery displayed on the right side of the character information; and 3) the progress of the charging operation indicated in the upper part of the first display region X1 ("Preparation", "Testing", "Charging", and "Finish"). Further, according to the status of the charging apparatus 10, the first display region X1 displays character information, such as "Preparation for Charging. About 20 Minutes for Charging Finish", as shown in FIG. 16 for example, as information on the charged state together with an illustration (graph). As shown in FIGS. 15 and 16, the background color of the first display region X1 is white, for example.

The second display region X2 displays precaution to at least the operator. The precaution is information, such as "Push "Stop Charging" Below to Stop" as shown FIG. 15. Further, according to the status of the charging apparatus 10, precaution "Danger in Charging. Do Not Touch Connector and Surroundings" is displayed together with an illustration, as shown in FIG. 16 for example. The background color of the second display region X2 is black, for example.

As described with reference to FIGS. 15 and 16, the display screen 73 of the indicator 72 is divided horizontally into the first display region X1 and the second display region X2. The first display region X1 displays the state relating to the charged state, while the second display region X2 displays the precaution. The background color of the first display region X1 is set to be white, while the background color of the second display region X2 is set to be black. Thus, the operator can easily understand the displayed information of the display screen 73, thereby obtaining an indicator excellent in legibility of the display screen 73.

The background color of the first display region X1 and the background color of the second display region X2 may be opposite to each other. That is, the background color of the first display region X1 may be set to be black, while the background color of the second display region X2 is set to be white. Alternatively, a color indicator may be employed instead of the monochrome indicator. In this case, when the background color of the first display region X1 and the background color of the second display region X2 are set in a complementary color relationship, the legibility of the display screen 73 can be enhanced.

In addition, other than the vertical arrangement of the first display region X1 and the second display region X2, the first display region X1 and the second display region X2 can be arranged horizontally. Specifically, the first display region X1 may be arranged on the left side of the second display region X2.

It is noted that one embodiment is not limited to the above described embodiments, and can be changed within the scope that does not change the subject matter of the embodiments. For example, the technical scope of one embodiment encompasses an invention according to a combination of part or all of the above described embodiments and modified examples.

The operating tool 50 in the above described embodiment includes the indicator 72 and the plurality of buttons (hardware switches). However, as far as the operating tool 50 has an operation function for operating to charge to the charging target, the operating tool 50 is not limited to one including the indicator 72 and the hardware switches. For example, the indicator 72 can be a touch panel, and at least some of the plurality of hardware switches may be buttons (hardware switches) displayed on the indicator 72.

In addition, the notched portion may be formed in the left end part of the protrusion 34.

The charging cable 38 can be arranged so as to extend downward from the upper left part of the base 32.

What is claimed is:

1. A charging apparatus for charging electric power supplied from a power source to a charging target, comprising:
    a station section configured to supply the electric power to the charging target,
    wherein the station section includes:
        a base extending in a vertical direction;
        a protrusion fixed to a part of the base and protruding frontward than the base; and
        a charging cable,
    wherein a charging connector to be connected to the charging target is attached to a distal end of the charging cable, and
    wherein the tip end of the right end part or the left end part of the protrusion is notched to form a notched portion, and a catcher to which the charging connector is caught being provided in the notched portion.

2. The charging apparatus of claim 1, wherein the protrusion includes an operating tool for operating to charge to the charging target.

3. The charging apparatus of claim 2, wherein the protrusion decreases in vertical width as it goes frontward from the base and has a rounded tip end.

4. The charging apparatus of claim 2, wherein the operating tool is arranged within a height range of 1000±200 mm from a ground plane of an operator.

5. The charging apparatus of claim 1, comprising:
    a power source section configured to supply the electric power to the charging target.

6. The charging apparatus of claim 1, wherein the charging cable extends downward from the upper part of the base.

7. The charging apparatus of claim 1, wherein the at least one article is at least one of a bulletin board, a monitor for displaying information, a shelf, a showcase for displaying goods, a reader for reading card information, and a mirror.

8. The charging apparatus of claim 1, wherein space for disposing at least one article is formed at least above or below the protrusion.

9. A charging apparatus for charging electric power supplied from a power source to a charging target, comprising:
    a power supply means configured to supply the electric power to the charging target,
    wherein the power supply means includes:
        a fixing means;
        a protruding means protruding frontward than the fixing means; and
        an electric power conveying means,
    wherein the fixing means extends in a vertical direction and fixes the protruding means,
    wherein a connecting means to be connected to the charging target is attached to a distal end of the electric power conveying means, and
    wherein the tip end of the right end part or the left end part of the protrusion is notched to form a notched portion, and a catcher to which the connecting means is caught being provided in the notched portion.

10. The charging apparatus of claim 9, wherein space for disposing at least one article is formed at least above or below the protruding means.

* * * * *